(12) United States Patent
Kawai

(10) Patent No.: US 8,676,738 B2
(45) Date of Patent: Mar. 18, 2014

(54) RELATIONSHIP DETECTOR, RELATIONSHIP DETECTION METHOD, AND RECORDING MEDIUM

(75) Inventor: Hideki Kawai, Tokyo (JP)

(73) Assignee: NEC Corporation, Tokyo (JP)

(*) Notice: Subject to any disclaimer, the term of this patent is extended or adjusted under 35 U.S.C. 154(b) by 272 days.

(21) Appl. No.: 13/062,174

(22) PCT Filed: Aug. 26, 2009

(86) PCT No.: PCT/JP2009/064865
§ 371 (c)(1),
(2), (4) Date: Mar. 3, 2011

(87) PCT Pub. No.: WO2010/026900
PCT Pub. Date: Mar. 11, 2010

(65) Prior Publication Data
US 2012/0030161 A1    Feb. 2, 2012

(30) Foreign Application Priority Data
Sep. 3, 2008    (JP) ................................ 2008-225585

(51) Int. Cl.
*G06F 17/00*    (2006.01)
*G06N 5/02*    (2006.01)

(52) U.S. Cl.
USPC ........................................................ 706/48

(58) Field of Classification Search
None
See application file for complete search history.

(56) References Cited

U.S. PATENT DOCUMENTS 6,249,755 B1 *    6/2001    Yemini et al. ................. 702/183

FOREIGN PATENT DOCUMENTS

| JP | 11-053394 | 2/1999 |
| JP | 2003-076715 | 3/2003 |
| JP | 2003-173355 | 6/2003 |
| JP | 2003-248696 | 9/2003 |
| JP | 2004-086352 | 3/2004 |
| JP | 2004-178515 | 6/2004 |
| JP | 2004-348179 | 12/2004 |
| JP | 2005-018689 | 1/2005 |
| JP | 2005-092442 | 4/2005 |
| JP | 2005-242454 | 9/2005 |
| JP | 2007-079730 | 3/2007 |
| JP | 2007-293685 | 11/2007 |

* cited by examiner

*Primary Examiner* — Kakali Chaki
*Assistant Examiner* — Luis Sitiriche
(74) *Attorney, Agent, or Firm* — McGinn IP Law Group, PLLC

(57) ABSTRACT

For a group of elements defined with a first relationship between elements stored in a first data memory unit and a second relationship therebetween different from the first relationship stored in a second data memory unit, a relationship detector includes a first distance calculating unit that calculates a predetermined first distance between the two elements belonging to the group in the first relationship, a second distance calculating unit that calculates a predetermined second distance between the two elements belonging to the group in the second relationship, and an unpredictability calculating unit that calculates a dissociation level between the first distance and the second distance between the two elements belonging to the group through a predetermined rule.

13 Claims, 11 Drawing Sheets

FIG.3

| EVENT NAME | APPEARED DOCUMENT ID |
|---|---|
| EVENT A | D01, D02, D03, D05, D10, D12, D14, D15 |
| EVENT B | D01, D02, D03, D07, D10, D12, D14 |
| EVENT C | D03, D05, D06, D12, D14 |
| EVENT D | D01, D03, D04, D05, D07, D10, D14, D15 |
| EVENT E | D02, D03, D07, D10, D14 |
| EVENT F | D04, D05, D08, D11 |
| EVENT G | D04, D08, D09, D12, D13 |
| EVENT H | D04, D08, D09, D11, D15 |
| ... | ... |

FIG.4

| FIRST DISTANCE | COMBINATION | UNPREDICTABILITY SCORE |
|---|---|---|
| 1 | EVENT A → EVENT C | 2.24 |
| 1 | EVENT A → EVENT D | 2.00 |
| 1 | EVENT A → EVENT B | 1.73 |
| 2 | EVENT A → EVENT H | 1.66 |
| 2 | EVENT A → EVENT E | 1.12 |
| 3 | EVENT A → EVENT G | 1.15 |
| 3 | EVENT A → EVENT F | 1.05 |

FIG.6

| FIRST DISTANCE | COMBINATION | UNPREDICTABILITY SCORE |
|---|---|---|
| EQUAL TO OR GREATER THAN ONE AND LESS THAN THREE | EVENT A → EVENT E | 0.89 |
| | EVENT A → EVENT B | 0.59 |
| | EVENT A → EVENT D | 0.50 |
| | EVENT A → EVENT C | 0.45 |
| EQUAL TO OR GREATER THAN THREE AND LESS THAN FIVE | EVENT A → EVENT F | 0.95 |
| | EVENT A → EVENT G | 0.87 |
| | EVENT A → EVENT H | 0.60 |

FIG.9

| FIRST DISTANCE | COMBINATION | UNPREDICTABILITY SCORE |
|---|---|---|
| EQUAL TO OR GREATER THAN ONE AND LESS THAN THREE | EVENT A → EVENT H | 0.44 |
| | EVENT A → EVENT E | 0.36 |
| | EVENT A → EVENT C | 0.32 |
| | EVENT A → EVENT D | 0.14 |
| | EVENT A → EVENT B | 0.06 |
| EQUAL TO OR GREATER THAN THREE AND LESS THAN FIVE | EVENT A → EVENT F | 0.35 |
| | EVENT A → EVENT G | 0.13 |

RELATIONSHIP DETECTOR, RELATIONSHIP DETECTION METHOD, AND RECORDING MEDIUM

TECHNICAL FIELD

The present invention relates to a relationship detector, a relationship detection method, and a recording medium, and more specifically, a relationship detector that can detect a relationship with unpredictability between words or persons.

BACKGROUND ART

Recently, relationship mining becomes important as a technology of finding a useful knowledge from a large amount of document data. According to such relationship mining, calculation of the similarity and distance between subjects of mining is requisite. Examples of the subject of relationship mining are a relationship between key words present in a document, a relationship between intrinsic representations, such as the names of persons, and the names of organisms, a relationship between a document and a keyword, and a relationship between documents. Hereinafter, the subject of relationship mining will be generally referred to as a mining target.

For example, patent literature 1 discloses a technology of visualizing a human relationship as a weighted network by calculating, as a co-occurrence degree, the rate of appearance of the name of each person in the same document through a web search engine with the names of persons being as mining targets. Moreover, patent literature 2 discloses a technology of searching a document close to the preference of a user using a cosine similarity with documents being as mining targets.

Patent literature 3 discloses a technology of using the length of a backward matching letter string as the similarity of lexical information at the time of calculation of the similarity between words. Moreover, patent literature 3 calculates the linear sum of plural similarities, such as a first similarity based on the co-occurrence degree in a dependency relationship between words, and a second similarity based on the consistency of the meaning category where the words belong, thereby determining the similarity.

PRIOR ART DOCUMENT

Patent Literature

Patent Literature 1: Unexamined Japanese Patent Application KOKAI Publication No. 2004-348179
Patent Literature 2: Unexamined Japanese Patent Application KOKAI Publication No. H11-53394
Patent Literature 3: Unexamined Japanese Patent Application KOKAI Publication No. 2007-079730

SUMMARY OF THE INVENTION

Problem to be Solved by the Invention

The problem of the mining technology of relating relationship is that it is difficult to search an unpredictable relationship in consideration of a difference between relationships with different standpoints.

For example, causal relationships between events "the soccer world cup is held→soccer becomes popular→a sport maker increases its profit" and "the soccer world cup is held→the number of viewers of a late-night broadcasting increases→an energy drink maker increases its profit" are in a two-hop relationship over a graph structure. However, it is important to enable searching of the latter causal relationship with unpredictability rather than the former causal relationship that most people can think up.

Moreover, when a person having a similar interest is searched using a human relationship, if "a person located away from a person A in the relationship over a graph structure and having a similarity in an interest range" is searched rather than "a person located close to the person A in the relationship over a graph structure and having a similarity in an interest range" is searched, unexpected detection and serendipity (lucky find) are often obtained. Because "a person located close to the person A in the relationship over a graph structure and having a similarity in an interest range" is already an acquaintance with the person A, such a person highly possibly has similar experiences and knowledge to the person A. In contrast, "a person located away from the person A in the relationship over a graph structure and having a similarity in an interest range" has different surrounding human relationship and environment from those of the person A, and highly possibly has different experiences and knowledge.

According to the technologies disclosed in patent literatures 1 and 2, however, it is difficult to search "another mining target having weak relationship in another standpoint although having a strong relationship in a standpoint with a mining target" using relationships in plural standpoints as explained above. This is because the technologies disclosed in patent literatures 1 and 2 use merely independent relationship, and have no structure of using plural relationships simultaneously.

Moreover, the technology disclosed in patent literature 3 uses a linear sum of plural relationships when searching a word, which enables searching of a word with a further high similarity. The technology disclosed in patent literature 3 has, however, no structure of comparing plural relationships, so that searching in consideration of mutual comparison of relationships is unable.

It is an object of the present invention to provide a relationship detector, a relationship detection method, and a recording medium which can search an unexpected relationship in consideration of mutual comparison of relationships between elements from different standpoints.

Means for Solving the Problem

A relationship detector according to a first aspect of the present invention is for a group of elements defined with a first relationship between elements and a second relationship therebetween different from the first relationship, and the relationship detector comprises: a first distance calculating unit that calculates a predetermined first distance between two elements belonging to the group in the first relationship; a second distance calculating unit that calculates a predetermined second distance between the two elements belonging to the group in the second relationship; and an unpredictability calculating unit that calculates a dissociation level between the first distance and the second distance each between the two elements belonging to the group through a predetermined rule.

A relationship detection method according to a second aspect of the present invention is for a group of elements defined with a first relationship between elements and a second relationship therebetween different from the first relationship, and the relationship detection method comprises: a first distance calculating step of calculating a predetermined first distance between two elements belonging to the group in the first relationship; a second distance calculating step of calculating a predetermined second distance between the two elements belonging to the group in the second relationship; and an unpredictability calculating step of calculating a dissociation level between the first distance and the second distance each between the two elements belonging to the group through a predetermined rule.

A computer-readable recording medium according to a third aspect of the present invention stores a relationship detection program for a group of elements defined with a first relationship between elements and a second relationship therebetween different from the first relationship, the relationship detection program allowing a computer to function as: a first distance calculating unit that calculates a predetermined first distance between two elements belonging to the group in the first relationship; a second distance calculating unit that calculates a predetermined second distance between the two elements belonging to the group in the second relationship; and an unpredictability calculating unit that calculates a dissociation level between the first distance and the second distance each between the two elements belonging to the group through a predetermined rule.

Effect of the Invention

According to the present invention, it is possible to extract, as an unpredictable relationship, a combination of mining targets located far apart from each other from the standpoint of a relationship but are located close to each other on a distance scale from the standpoint of another relationship. This is because the ratio of distance scales of relationships from the standpoint of different two relationships is calculated as an unpredictability score, and the larger the unpredictability score is, the higher the combination of such mining targets is displayed up on.

BRIEF DESCRIPTION OF DRAWINGS

FIG. 3 is a diagram showing second example data according to the first embodiment;

FIG. 4 is a diagram showing an example output result by unpredictability calculation according to the first embodiment;

FIG. 6 is a diagram showing an example output result by unpredictability calculation according to the first embodiment;

FIG. 9 is a diagram showing an example output result by second unpredictability calculation according to the second embodiment;

BEST MODE FOR CARRYING OUT THE INVENTION

In order to figure out a relationship quantitatively, the present invention introduces a concept that is a distance obtained by generalizing a relationship. Examples of a distance scale representing a relationship are a distance scale by a co-occurrence degree, a distance scale over a graph structure, a distance scale over a vector space, and an editorial distance scale.

The distance scale by a co-occurrence degree is a distance scale based on a way of thinking that keywords appearing simultaneously on the same document have a deeper relationship. This distance scale can be calculated using Jaccard coefficient, Simpson coefficient, mutual information content, etc.

The graph structure is a structure expressed by a graph interconnecting nodes that are elements with an edge representing a relationship therebetween using a term of graph logic. The graph structure is often called a network structure. The distance scale on the graph structure is calculated as the shortest path length, a weighted path length between nodes which are relationships therebetween. For example, on the graph structure obtained through the technology disclosed in patent literature 1, a distance of a relationship between arbitrary two persons can be expressed as the shortest path length therebetween.

The editorial distance scale is a distance scale focusing on the consistency of lexical information. Examples of this distance scale are a number of frontward matching letter strings, a number of backward matching letter strings, a Hamming distance, and a Levenshtein distance.

First Embodiment

Figure 1:
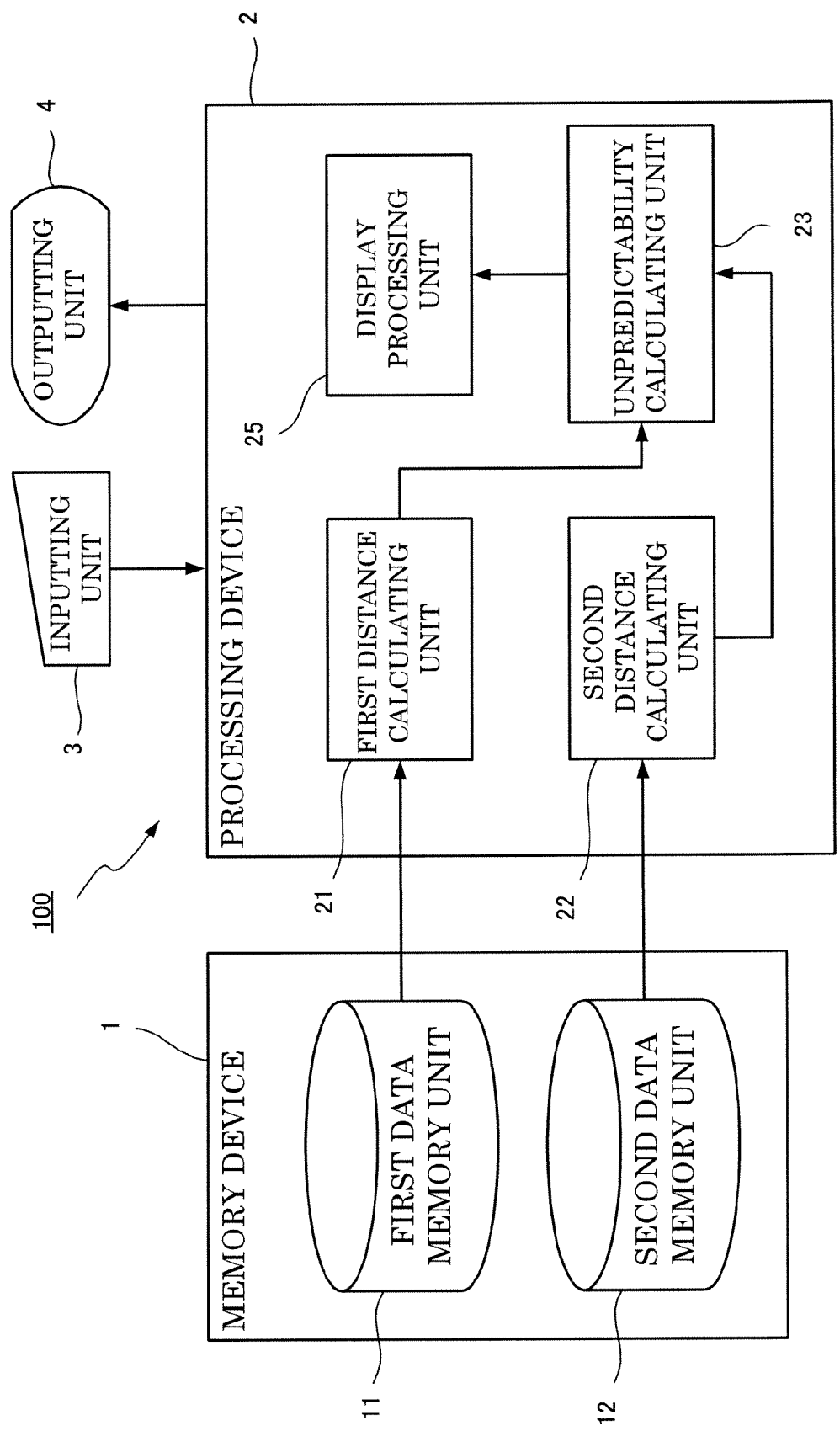
FIG. 1 is a block diagram showing an illustrative configuration of a relationship detector according to a first embodiment.

FIG. 1 is a block diagram showing an illustrative configuration of a relationship detector according to a first embodiment of the present invention. With reference to FIG. 1, a relationship detector 100 includes a memory device 1, a processing device 2, an inputting unit 3 like a keyboard, and an outputting unit 4 like a display, a printer, etc.

The memory device 1 includes a first data memory unit 11 and a second data memory unit 12. Moreover, the processing device 2 includes a first distance calculating unit 21, a second distance calculating unit 22, an unpredictability calculating unit 23, and a display processing unit 25.

The memory device 1 may be connected to the processing device 2 through a non-illustrated network. The memory device 1 and the processing device 2 may be realized by, for example, a computer, and may be separate devices connected through a communication network. When the memory device 1 and the processing device 2 are separate devices, the processing device 2 serves as the relationship detector in a restricted meaning.

Figure 2:
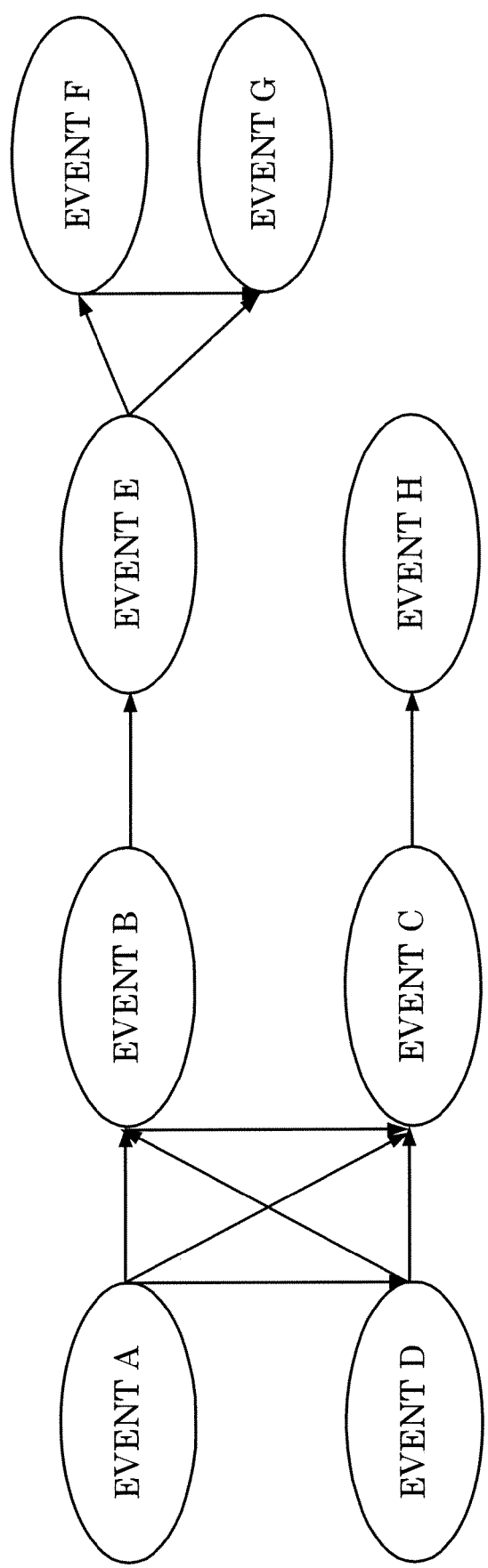
FIG. 2 is a diagram showing first example data according to the first embodiment.

The first data memory unit 11 stores first data representing a relationship between mining targets. FIG. 2 shows example first data. In FIG. 2, event expressions are used as mining targets, and the first data represents a causal relationship between events. In the case of FIG. 2, an event A, an event B, an event C, and an event D are in direct causal relationships, but the event A and the event E are in an indirect causal relationship. Specific examples of the event expression are "a soccer world cup is held", "a soccer population increases", "a sport maker increases its profit", "the number of audience of late-night broadcasting increases", and "an energy drink maker increases its profit".

The second data memory unit 12 stores second data representing a relationship between mining targets. FIG. 3 shows example second data. In FIG. 3, event expressions are used as mining targets, and the second data represents a list of documents where an event expression appears. In the case of FIG. 3, an event expression indicating the event A appears in documents D01, D02, D03, D05, D10, D12, D14, and D15.

The first distance calculating unit 21 calculates a first distance between mining targets for data stored in the first data memory unit 11 based on a distance scale set beforehand with an element fitting a query specified by the inputting unit 3 being as an origin. A first distance between an element X and an element Y is denoted as D1(X, Y). For example, it is presumed that data stored in the first data memory unit 11 has a graph structure of event expressions as shown in FIG. 2, and the distance scale set beforehand is the shortest path length (the number of edges in the shortest path). When a query specified by the inputting unit 3 is the "event A", in the case of the relationship shown in FIG. 2, a distance between the event A and the event C is D1(event A, event C)=1, a distance between the event A and the event E is D1(event A, event E)=2, and a distance between the event A and the event F is D1(event A, event F)=3.

The second distance calculating unit 22 calculates a second distance between mining targets for data stored in the second data memory unit 12 based on a distance scale set beforehand with an element fitting a query specified by the inputting unit 3 being as an origin. A second distance between the element X and the element Y is denoted as D2(X, Y). For example, it is presumed that data stored in the second data memory unit 12 is a list of documents where an event expression appears as shown in FIG. 3. Based on the document list, a document where an event expression appears has a value 1, and a document where no event expression appears has a value 0, and values of all documents with respect to an event are lined up, thereby expressing such an event as a vector. The vector expressing an event is called a document vector. Accordingly, a distance between events can be defined by, for example, the Euclidean distance of the document vector.

Here, as shown in FIG. 3, it is presumed that there are 15 documents having respective IDs of D01 to D15, and a distance scale set beforehand is the Euclidean distance of a document vector. In this case, when a query specified by the inputting unit 3 is the "event A", a document vector Va where the event A appears can be expressed as:

$$Va=(1,1,1,0,1,0,0,0,0,1,0,1,0,1,1)$$

and a document vector Vb where the event B appears can be expressed as:

$$Vb=(1,1,1,0,0,0,1,0,0,1,0,1,0,1,0)$$

Accordingly, a distance D2 between the event A and the event B can be obtained as:

$$\begin{aligned} D2(\text{event } A, \text{event } B) &= |Va - Vb| \\ &= |(1, 1, 1, 0, 1, 0, 0, 0, 0, 1, 0, 1, 0, 1, 1) - \\ &\quad (1, 1, 1, 0, 0, 0, 1, 0, 0, 1, 0, 1, 0, 1, 0)| \\ &= SQRT(0+0+0+0+1+0+1+0+ \\ &\quad 0+0+0+0+0+0+1) \\ &= SQRT(3) = 1.73 \end{aligned}$$

where SQRT means a (positive) square root. In this case, the second distance indicates the inverse of a relevancy between topics where an event belongs, i.e., an irrelevancy.

As explained above, the second distance can be calculated as the Euclidean distance. However, D2 can be defined as the Hamming distance by taking a document vector as a binary bit sequence of authenticity. In the case of the document vector, the Euclidean distance is a square root of Hamming distance.

The unpredictability calculating unit 23 calculates, as an unpredictability score, a ratio D2/D1 between the second distance D2 calculated by the second distance calculating unit 22 and the first distance D1 calculated by the first distance calculating unit 21. The display processing unit 25 rearranges combinations of mining targets with the same first distance in an order that the unpredictability score D2/D1 is high, and displays those on the outputting unit 4.

Figure 5:
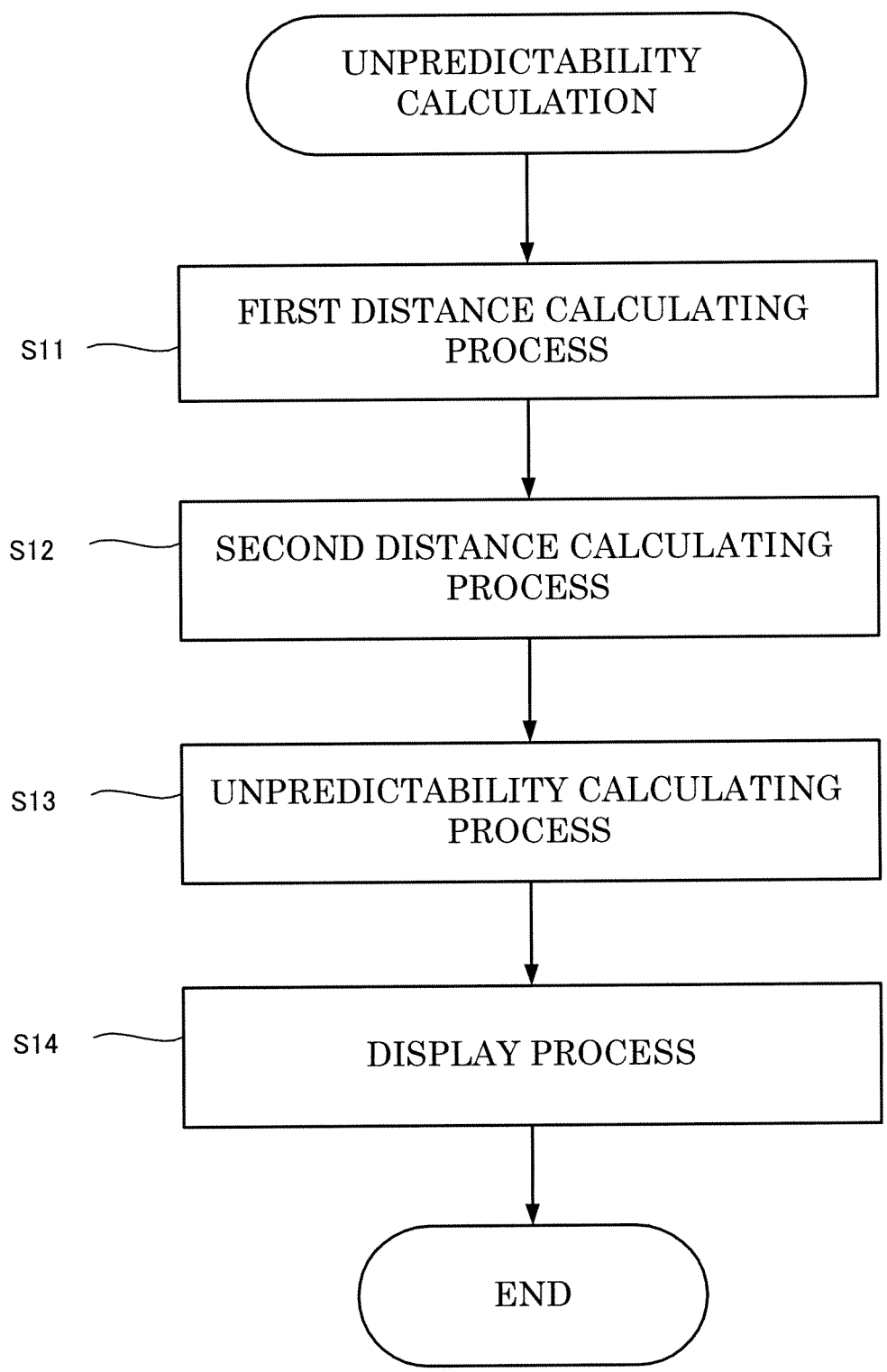
FIG. 5 is a flowchart showing an example operation by the relationship detector according to the first embodiment.

Next, with reference to FIGS. 1 to 5, an explanation will be given of an operation according to the present embodiment. FIG. 5 is a flowchart showing an example operation by the relationship detector according to the present embodiment.

First, upon inputting of a query by the inputting unit 3, the first distance calculating unit 21 calculates a first distance between mining targets for data stored in the first data memory unit 11 based on a distance scale set beforehand with an element fitting the query being as an origin (step S11 in FIG. 5). For example, it is presumed that data stored in the first data memory unit 11 is a graph structure of event expressions as shown in FIG. 2 and the distance scale set beforehand is the shortest path length over the network. In this case, when the query specified by the inputting unit 3 is the "event A", in the case of FIG. 2, respective first distances D1 from the event A to other events are as follows:

$$D1(\text{event } A, \text{event } C)=1$$

$$D1(\text{event } A, \text{event } D)=1$$

$$D1(\text{event } A, \text{event } E)=2$$

$$D1(\text{event } A, \text{event } F)=3$$

$$D1(\text{event } A, \text{event } G)=3$$

$$D1(\text{event } A, \text{event } H)=2$$

Next, the second distance calculating unit 22 calculates a second distance between mining targets for data stored in the second data memory unit 12 based on a distance scale set beforehand with an element fitting a query specified by the inputting unit 3 being as an origin (step S12 in FIG. 5). For example, it is presumed that data stored in the second data memory unit 12 is a list of documents where an event name appears as shown in FIG. 3, and the distance scale set beforehand is the Euclidean distance of a document vector. As shown in FIG. 3, there are fifteen documents having respective IDs of D01 to D15, a document where the event name appears has a value 1, and a document where no event name appears has a value 0, and are expressed as a vector.

An explanation will now be given of an example case in which the query specified by the inputting unit 3 is the "event A". As explained above, the document vector where the event A appears can be expressed as follow:

$$Va=(1,1,1,0,1,0,0,0,0,1,0,1,0,1,1) \text{ and}$$

the document vector where the event B appears can be expressed as follows:

$$Vb=(1,1,1,0,0,0,1,0,0,1,0,1,0,1,0)$$

Accordingly, the distance D2 between the event A and the event B can be expressed as:

$$D2(\text{event } A, \text{event } B) = |Va - Vb|$$
$$= |(1, 1, 1, 0, 1, 0, 0, 0, 0, 1, 0, 1, 0, 1, 1) -$$
$$(1, 1, 1, 0, 0, 0, 1, 0, 0, 1, 0, 1, 0, 1, 0)|$$
$$= SQRT(0 + 0 + 0 + 0 + 1 + 0 + 1 + 0 +$$
$$0 + 0 + 0 + 0 + 0 + 0 + 1)$$
$$= SQRT(3) = 1.73$$

Likewise, with reference to FIG. 3, the second distances D2 from the event A to the other events are as follows.

$D2(\text{event } A, \text{event } C) = SQRT(5) = 2.24$ $D2(\text{event } A, \text{event } D) = SQRT(4) = 2.00$ $D2(\text{event } A, \text{event } E) = SQRT(5) = 2.24$ $D2(\text{event } A, \text{event } F) = SQRT(10) = 3.16$ $D2(\text{event } A, \text{event } G) = SQRT(12) = 3.46$ $D2(\text{event } A, \text{event } H) = SQRT(11) = 3.32$ Next, the unpredictability calculating unit 23 calculates, as an unpredictability score, a ratio D2/D1 between the second distance D2 calculated by the second distance calculating unit 22 and the first distance D1 calculated by the first distance calculating unit 21 (step S13 in FIG. 5).

For example, respective ratios between the first distance and the second distance from the event A to other events are as follows.

$D2(\text{event } A, \text{event } B)/D1(\text{event } A, \text{event } B) = 1.73/1 = 1.73$ $D2(\text{event } A, \text{event } C)/D1(\text{event } A, \text{event } C) = 2.24/1 = 2.24$ $D2(\text{event } A, \text{event } D)/D1(\text{event } A, \text{event } D) = 2.00/1 = 2.00$ $D2(\text{event } A, \text{event } E)/D1(\text{event } A, \text{event } E) = 2.24/2 = 1.12$ $D2(\text{event } A, \text{event } F)/D1(\text{event } A, \text{event } F) = 3.16/3 = 1.05$ $D2(\text{event } A, \text{event } G)/D1(\text{event } A, \text{event } G) = 3.46/3 = 1.15$ $D2(\text{event } A, \text{event } H)/D1(\text{event } A, \text{event } H) = 3.32/2 = 1.66$ Although the tendency of a document where events appear largely differs, events located close to each other on a graph have a higher unpredictability score.

The display processing unit 25 displays combinations of mining targets with the same first distance in an order that the unpredictability score D2/D1 is high (step S14). FIG. 4 shows a result of displaying combinations of mining targets with the same first distance in the cases of FIGS. 2 and 3. In the case of FIG. 4, in the causal relationships one hop ahead from the event A, the number of documents where the event C appears commonly with the event A is the minimum. Accordingly, the relationship between the event A and the event C is the most unpredictable relationship. Moreover, in the causal relation-ships two hops ahead from the event A, the number of documents where the event H appears commonly with the event A is smaller than the number of documents where the event E appears commonly with the event A. Accordingly, the relationship between the event A and the event H is more unpredictable than the relationship between the event A and the event E. Furthermore, in the causal relationships three hops ahead from the event A, the number of documents where the event G appears commonly with the event A is smaller than the number of documents where the event F appears commonly with the event A. Accordingly, the relationship between the event A and the event G is more unpredictable than the relationship between the event A and the event F.

In order to facilitate understanding, the explanation was given of a case in which the first distance D1 obtained by the first distance calculating unit 21 is the shortest path length over the network. However, how to obtain the first distance D1 may be a technique of, for example, adding a weight to an edge interconnecting nodes, and of obtaining, as the first distance D1, the smallest one among the total of weights of edges present between nodes, and is not limited to the technique disclosed in the present embodiment.

In the above-explained embodiment, in order to facilitate understanding, the explanation was given of a case in which the second distance D2 obtained by the second distance calculating unit 22 is the Euclidean distance of a document vector. However, how to obtain the second distance D2 may be a technique of using, for example, the above-explained Hamming distance, the inverse number of a cosine similarity between document vectors, or the Mahalanobis distance, and is not limited to the technique disclosed in the present embodiment.

In order to facilitate understanding of FIG. 4, the explanation was given of a case in which the display processing unit 25 displays combinations of mining targets with the same first distance in an order that the unpredictability score D2/D1 is high. However, the display processing unit 25 may display combinations of targets within a certain range set beforehand for each range in an order that the unpredictability score D2/D1 is high, such as "to display the combinations of mining targets with the first distance equal to or greater than one or less than three in an order that the unpredictability score D2/D1 is high" and is not limited to the technique disclosed in the present embodiment.

In the above-explained embodiment, the first data memory unit 11 stores network data as shown in FIG. 2, and the first distance calculating unit 21 calculates, as the first distance D1, the shortest path length over the network. Moreover, the second data memory unit 12 stores document list data as shown in FIG. 3, and the second distance calculating unit 22 calculates, as the second distance D2, the Euclidean distance of a document vector. However, the combination of a first relationship and the first distance, and that of a second relationship and the second distance can be in other forms, and are not limited to ones disclosed in the present embodiment.

For example, as a reverse case of the example explained in the foregoing embodiment, simply, the first data memory unit 11 may store document list data as shown in FIG. 3, and the first distance calculating unit 21 may calculate, as the first distance D1, the Euclidean distance of a document vector. Moreover, the second data memory unit 12 may store network data as shown in FIG. 2, and the second distance calculating unit 22 may calculate, as the second distance D2, the shortest path length over the network. In this case, the unpredictability score D2/D1 calculated in the step S13 shown in FIG. 5 will be as follows.

$$D2(\text{event }A,\text{event }B)/D1(\text{event }A,\text{event }B)=1/1.73=0.59$$

$$D2(\text{event }A,\text{event }C)/D1(\text{event }A,\text{event }C)=1/2.24=0.45$$

$$D2(\text{event }A,\text{event }D)/D1(\text{event }A,\text{event }D)=1/2.00=0.50$$

$$D2(\text{event }A,\text{event }E)/D1(\text{event }A,\text{event }E)=2/2.24=0.89$$

$$D2(\text{event }A,\text{event }F)/D1(\text{event }A,\text{event }F)=3/3.16=0.95$$

$$D2(\text{event }A,\text{event }G)/D1(\text{event }A,\text{event }G)=3/3.46=0.87$$

$$D2(\text{event }A,\text{event }H)/D1(\text{event }A,\text{event }H)=2/3.32=0.60$$

In this case, events having the similar tendency of documents where such events appear have a higher unpredictability score although such events are located apart from each other over the graph structure. FIG. 6 shows a result of displaying combinations of mining targets with unpredictability score being divided into two ranges: the first distance is "equal to or greater than one and less than three"; and the first distance is "equal to or greater than three and less than five". In the case of FIG. 6, among the document vectors where the event A appears and the events appearing in a document vector where the Euclidean distance is "equal to or greater than one and less than three", the event E is located farthest apart from the event A on the graph structure. Accordingly, the event A and the event E are in an unpredictable relationship. Moreover, among the document vectors where the event A appears and the events appearing in document vectors where the Euclidean distance is "equal to or greater than three and less than five", the event F is located farthest apart from the event A on the graph structure. Accordingly, the event A and the event F are in an unpredictable relationship.

Moreover, the first data memory unit 11 may store first network data as shown in FIG. 2, and the first distance calculating unit 21 may calculate, as the first distance D1, the shortest path length over the first network. The second data memory unit 12 may also store second network data generated based on another standpoint, and the second distance calculating unit 22 may calculate, as the second distance D2, the shortest path length over the second network. Thus, the present invention is not limited to the technique disclosed in the present embodiment. For example, when mining targets are theses, the first data may be a network of citation relationship, and the second data may be a network of collective writing with the same collective writer being as a link.

Moreover, in order to facilitate understanding, the explanation was given of the technique of obtaining an unpredictable relationship between events forming a causal relationship as mining targets. An unpredictability of various relationships, such as between words, between documents, between a word and a document, in addition to between events, may be determined, and the mining targets are not limited to ones explained in the present embodiment.

For example, when theses are mining targets, the first distance may be a path length over a graph structure formed by a citation relationship between theses, and the second distance may be an inverse of a cosine similarity of a keyword vector obtained based on appearing words in theses. In this case, because a citation relationship between theses belonging to different fields can be found out through the method of the present invention, it is expected that an unpredictable combination of technologies is found. Moreover, when mining targets are gene names, the first distance may be an edit distance of base sequence information of a gene, and the second distance may be an inverse of a cosine similarity of other gene groups affected by that gene. According to the method of the present invention, it is expected that a combination of genes affecting on completely different gene groups even through a base sequence structure is similar is found.

According to the method of the present invention, the unpredictability score is for comparing the orientation of the first distance between elements in the distribution of the first distances of the relationship between elements with the orientation of the second distance between elements in the distribution of the second distances of those elements, and represents how much orientations of such relationships in respective distributions differ. The level of difference of orientations in respective distributions of the two distances is called the level of dissociation or a dissociation level.

The dissociation level can be conceptually explained as follows using a standard deviation. A deviation 1 of the first distance between an element X and an element Y is calculated using the standard deviation of the distribution of the first distances. Moreover, a deviation 2 of the second distance between the element X and the element Y is calculated using the standard deviation of the distribution of the second distances. The difference between the deviation 1 and the deviation 2 corresponds to the dissociation level.

For example, the dissociation level is expressed as a difference between the deviation 1 and the deviation 2. In this case, the larger a difference between such deviations is, the larger the dissociation level, i.e., the unpredictability score is. Moreover, the dissociation level can be expressed as a ratio between the deviation 1 and the deviation 2. In this case, the farther the value of ratio becomes from 1 (i.e., the larger the absolute value of a logarithm is), the larger the dissociation level is.

When two relationships each of which is a relationship between two elements are compared with each other, it is appropriate if the largeness of the dissociation level can be mutually compared, not the absolute value of the dissociation level. Accordingly, it is appropriate if the value of the ratio between the second distance and the first distance is calculated without the standard deviation being calculated. This enables comparison of the largeness of the difference in the standardized orientations (the dissociation level=the unpredictability score) based on the orientation of the first distance. This is what the present specification explained as the unpredictability score in the first embodiment.

Accordingly, because the unpredictability score is the above-explained dissociation level, it can be calculated through various schemes in addition to the value of the ratio between the second distance and the first distance. For example, as explained above, the unpredictability score may be calculated as a deviation value normalized by a standard deviation. Moreover, the unpredictability score may be calculated as a value normalized based on the largeness of the distribution of the first distance and that of the second distance.

As explained above, the relationship detector of the first embodiment calculates the ratio between two different distances as the unpredictability score, and displays mining targets in an order that the unpredictability score is large. Accordingly, it is possible for a user to extract a combination of mining targets which are located apart from each other from the standpoint of a relationship but are located close to each other from the standpoint of another relationship.

Second Embodiment

Figure 7:
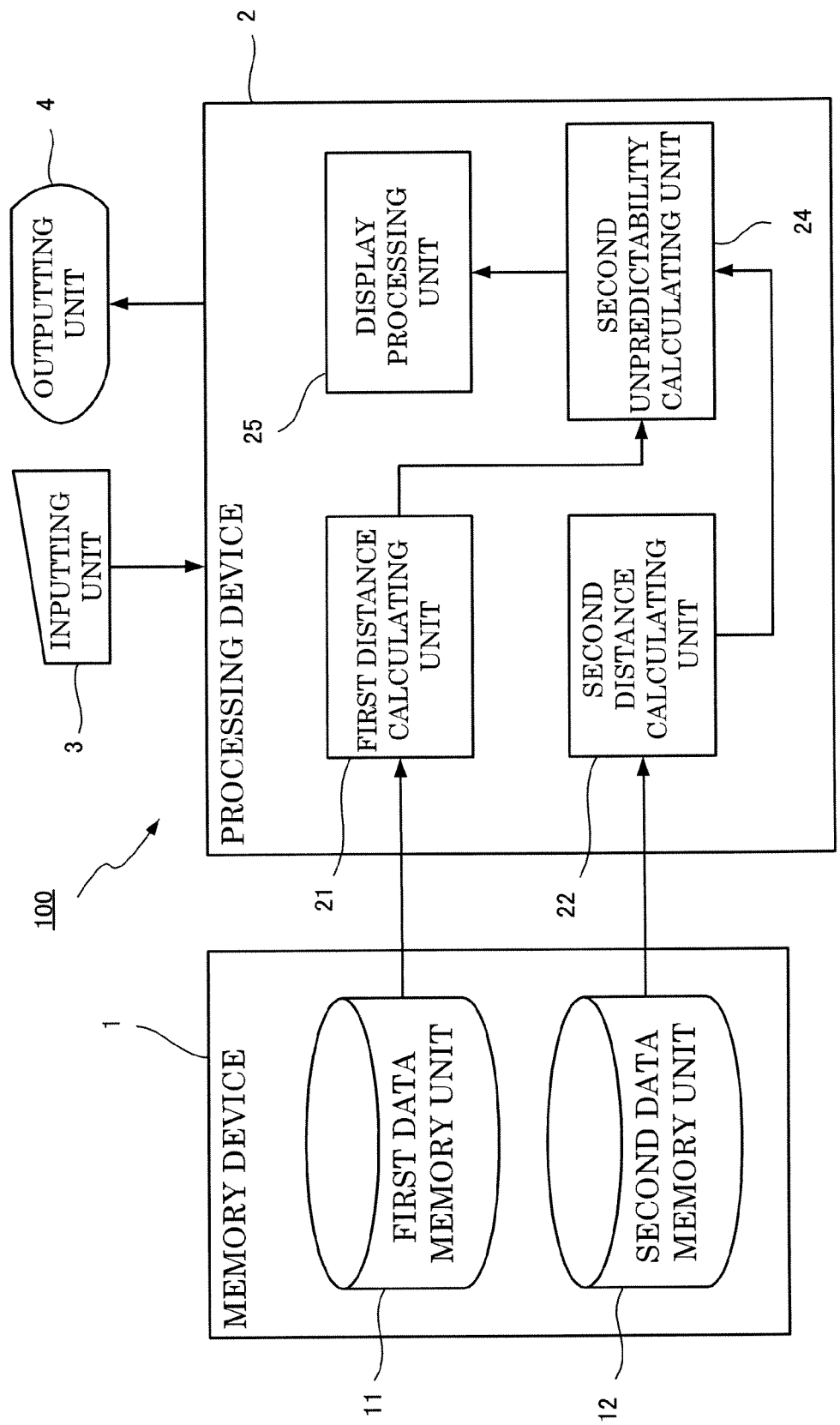
FIG. 7 is a block diagram showing an illustrative configuration of a relationship detector according to a second embodiment.

FIG. 7 is a block diagram showing an illustrative configuration of a relationship detector according to a second embodiment of the present invention. A relationship detector 100 of the second embodiment has a second unpredictability calculating unit 24 instead of the unpredictability calculating unit 23 of the first embodiment shown in FIG. 1.

The second unpredictability calculating unit 24 calculates a scatter diagram where a relationship between elements is plotted on a two-dimensional plane with the first distance and the second distance being as coordinate axes. The second unpredictability calculating unit 24 calculates, as the unpredictability score of a relationship, a level how much a point of the relationship on the two-dimensional plane is apart from a standard line representing the center of the distribution of the scatter diagram.

The regression curve of a distribution can be used as the standard line representing the center of the distribution of the scatter diagram. According to the second embodiment, as the standard line representing the center of the distribution of the scatter diagram, in particular, a regression curve is used. That is, for a distribution of relationships between elements on the two-dimensional plane with the first distance and the second distance being as coordinate axes, a regression curve is calculated. The distance between the point of each relationship and the regression curve is an unpredictability score. The distance between the point of the relationship and the regression curve is the length of a perpendicular line straight down from the point to the regression curve. Typically, the length of a normal line passing through the point of the relationship from that point to the regression curve is the unpredictability score. The unpredictability score is an example of the above-explained dissociation level.

Figure 10:
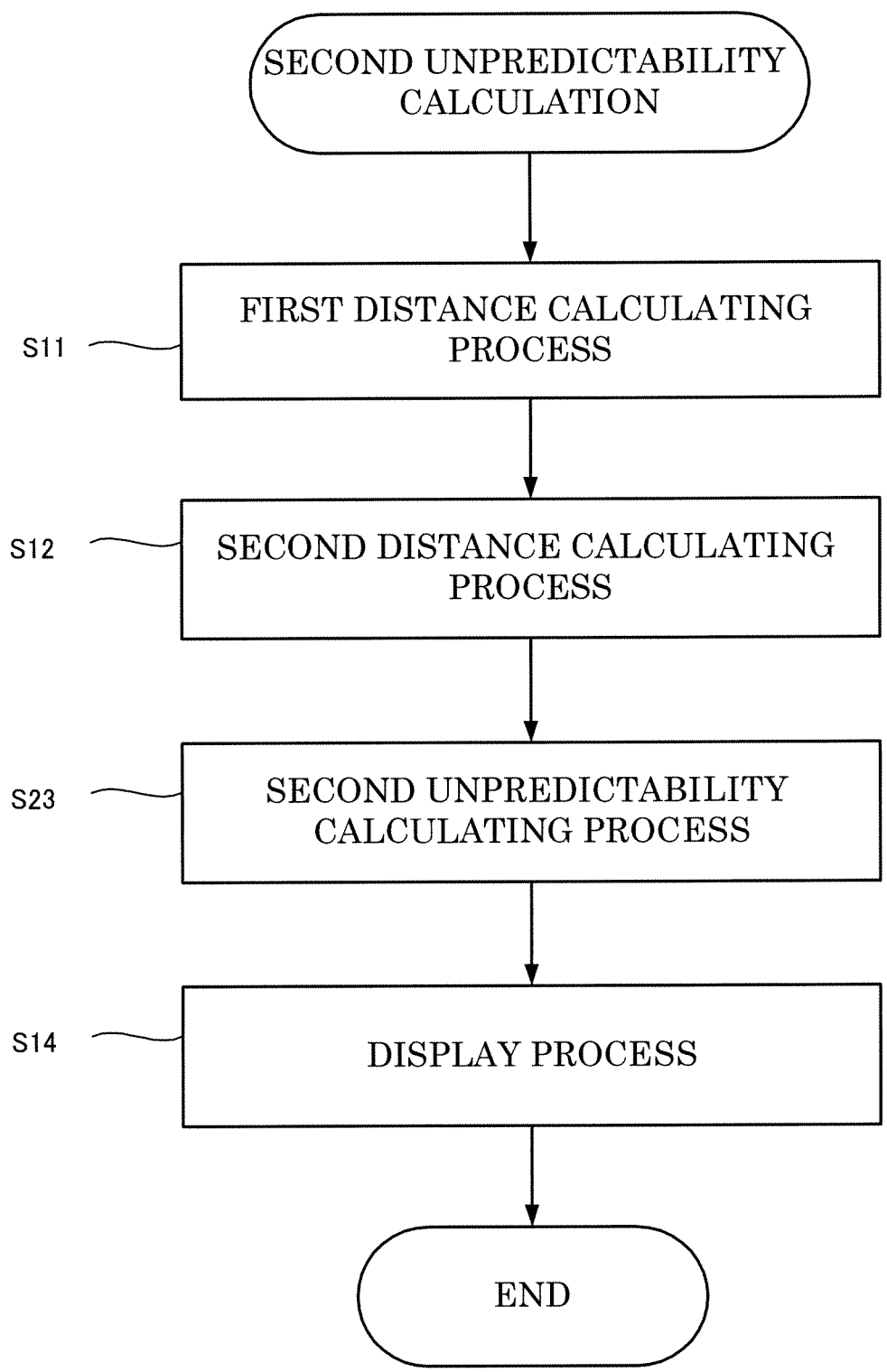
FIG. 10 is a flowchart showing an example operation by the relationship detector according to the second embodiment.

FIG. 10 is a flowchart showing an example operation by the relationship detector according to the second embodiment. The first distance calculating process (step S11) and the second distance calculating process (step S12) both shown in FIG. 10 are same as those of the first distance calculating process (step S11 in FIG. 5) and the second distance calculating process (step S12 in FIG. 5) according to the first embodiment.

An explanation will be given below of data used in the first embodiment as an example. The first data memory unit 11 stores network data as shown in FIG. 2, and the first distance D1 obtained by the first distance calculating unit 21 is the shortest path length over the network. Moreover, the second data memory unit 12 stores document list data as shown in FIG. 3, and the second distance D2 obtained by the second distance calculating unit 22 is the Euclidean distance of a document vector. It is presumed that a query specified by the inputting unit 3 is the "event A".

Figure 8:
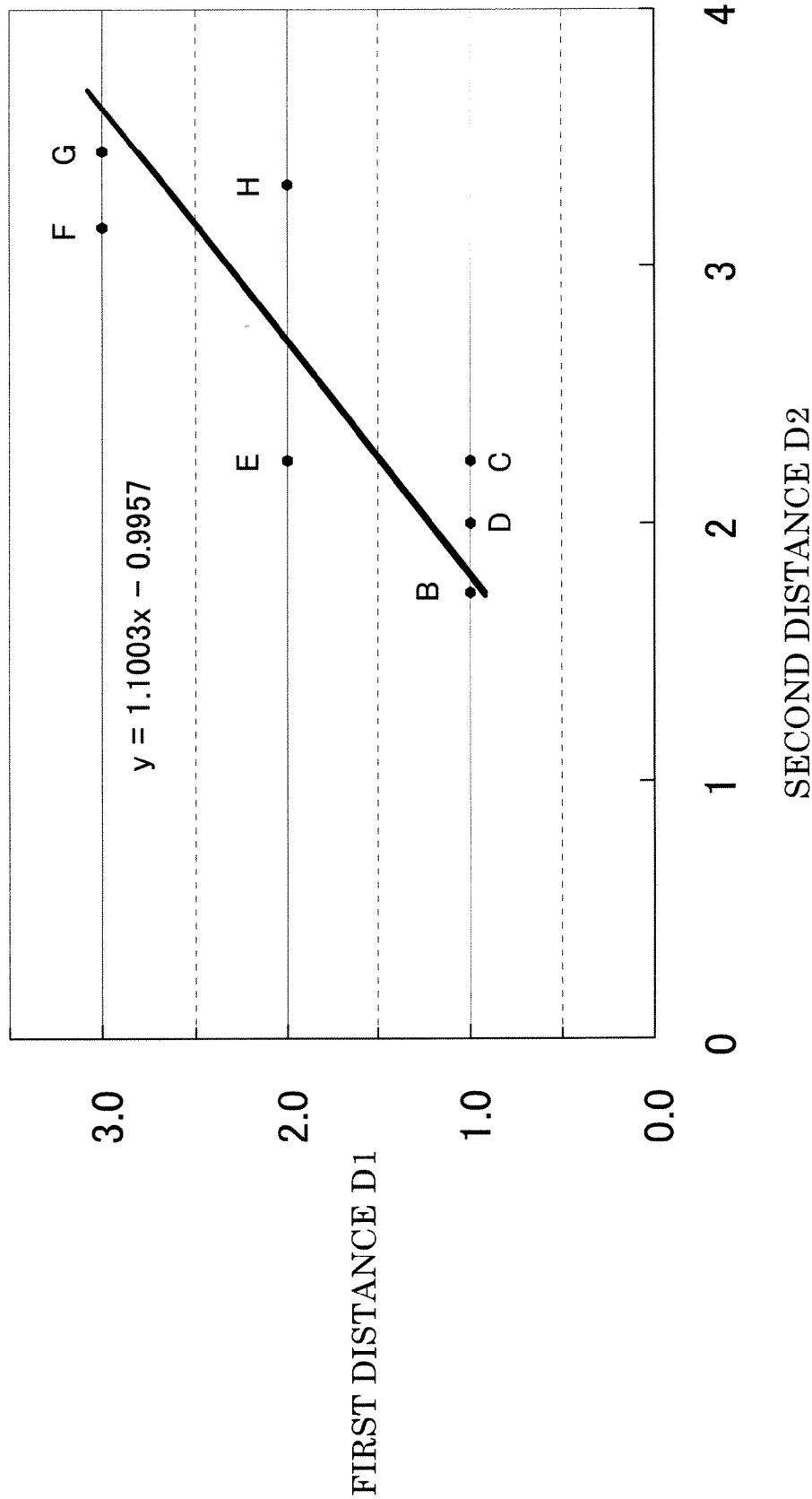
FIG. 8 is a diagram showing an example distribution of a distance between two relationships according to the second embodiment.

The second unpredictability calculating unit 24 plots the point of each relationship on a two-dimensional plane with the first and second distances being as coordinates, and obtains the regression curve of that scatter diagram through least square. Next, the second unpredictability calculating unit 24 calculates, as the unpredictability score, the length of the perpendicular line perpendicularly straight down from the plotted point of each relationship to the regression curve (step S23 in FIG. 10). FIG. 8 shows an example scatter diagram.

Coordinates of respective plots in FIG. 8 are as follows.

The coordinates of a point B is (D2(event A, event B), D1(event A, event B))=(1.73, 1).

The coordinates of a point C is (D2(event A, event C), D1(event A, event C))=(2.24, 1).

The coordinates of a point D is (D2(event A, event D), D1(event A, event D))=1).

The coordinates of a point E is (D2(event A, event E), D1(event A, event E))=(2.24, 2).

The coordinates of a point F is (D2(event A, event F), D1(event A, event F))=(3.16, 3).

The coordinates of a point G is (D2(event A, event G), D1(event A, event G))=(3.46, 3).

The coordinates of a point H is (D2(event A, event H), D1(event A, event H))=(3.32, 2).

By calculating the regression curve through least square with respect to those points, $$y=1.1003x-0.9957$$

is obtained. Respective distances when perpendicular lines are straight down from the points B to H to intersections over the regression curve are obtained as follows. A second unpredictability score between the event X and the event Y is denoted as SV(event X, event Y).

$SV$(event $A$,event $B$)=the length of the perpendicular line from the point $B$ to the regression curve=0.062

$SV$(event $A$,event $C$)=the length of the perpendicular line from the point $C$ to the regression curve=0.32

$SV$(event $A$,event $D$)=the length of the perpendicular line from the point $D$ to the regression curve=0.14

$SV$(event $A$,event $E$)=the length of the perpendicular line from the point $E$ to the regression curve=0.36

$SV$(event $A$,event $F$)=the length of the perpendicular line from the point $F$ to the regression curve=0.35

$SV$(event $A$,event $G$)=the length of the perpendicular line form the point $G$ to the regression curve=0.13

$SV$(event $A$,event $H$)=the length of the perpendicular line from the point $H$ to the regression curve=0.44

The display processing unit 25 rearranges and displays individual relationships in the order of second unpredictability scores (step S14). At this time, when it is preset beforehand that "a combination of mining targets with the first distance equal to or larger than one and less than three and a combination of mining targets with the first distance equal to or larger than three and less than five are displayed in the order of higher second unpredictability score", an output result becomes as shown in FIG. 9.

As shown in FIG. 9, within a range where the first distance is equal to or larger than one and less than three, the relationship between the event A and the event H is extracted as an unpredictable combination most departing from the regression curve. Moreover, within a range where the first distance is equal to or larger than three and less than five, the relationship between the event A and the event F is extracted as an unpredictable combination most departing from the regression curve.

Instead of the table format or in addition to such a table format as shown in FIG. 9, the display processing unit 25 may display a diagram in which the regression curve is superimposed on the distribution diagram of relationships. Reference of the screen display as shown in FIG. 8 makes it possible for the user to visually figure out an unpredictable combination.

The relationship detector of the first embodiment may have the second unpredictability calculating unit 24 in addition to the unpredictability calculating unit 23. As the relationship detector calculates two unpredictability scores, and displays both, it becomes possible for the user to compare unpredictability scores from different standpoints.

As explained above, the relationship detector according to the second embodiment plots combinations of mining targets on a two-dimensional plane having two different distances as coordinate axes, and obtains a regression curve of that distribution. The relationship detector calculates a distance between the plotted point and the regression curve as a second unpredictability score. Accordingly, it is possible for the user to extract a combination of mining targets located apart from each other from the standpoint of a distance in a relationship but located close to each other from the standpoint of a distance in another relationship as an unpredictable relationship.

Figure 11:
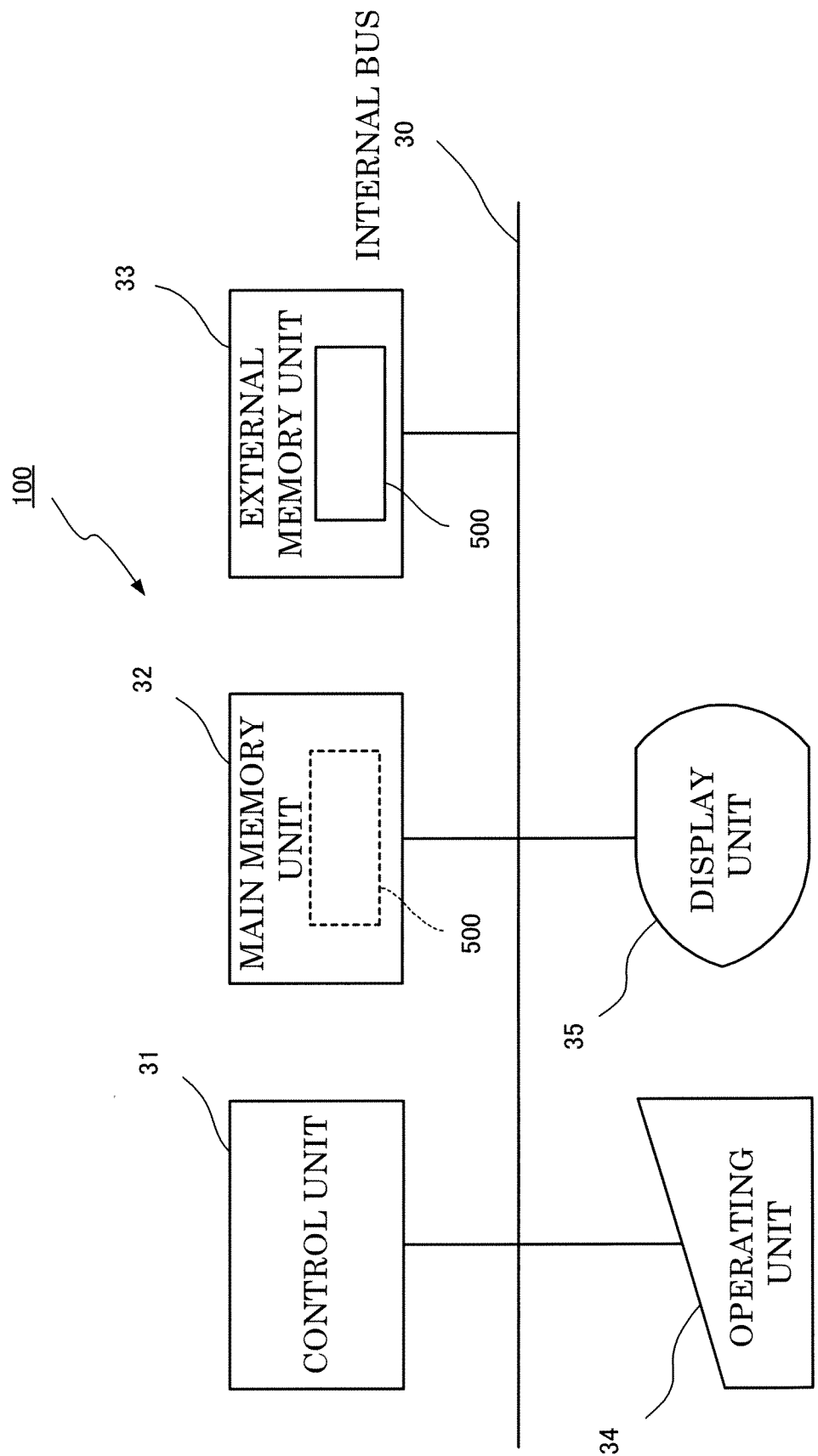
FIG. 11 is a block diagram showing an illustrative hardware configuration of a relationship detector.

FIG. 11 is a block diagram showing an illustrative hardware configuration of a relationship detector 100 shown in FIG. 1 or 7. As shown in FIG. 11, the relationship detector 100 includes a control unit 31, a main memory unit 32, an external memory unit 33, an operating unit 34, and a display unit 35. The main memory unit 32, the external memory unit 33, the operating unit 34, and the display unit 35 are all connected to the control unit 31 through an internal bus 30.

The control unit 31 comprises a CPU (Central Processing Unit), etc., and executes the process of the relationship detector 100 in accordance with a relationship detection program 500 stored in the external memory unit 33.

The main memory unit 32 comprises a RAM (Random Access Memory), etc., loads the relationship detection program 500 stored in the external memory unit 33, and is used as a work area for the control unit 31.

The external memory unit 33 comprises a nonvolatile memory, such as a flash memory, a hard disk, a DVD-RAM (Digital Versatile Disc Random-Access Memory), or a DVD-RW (Digital Versatile Disc ReWritable), etc. The external memory unit 33 stores the relationship detection program 500 beforehand in order to cause the control unit 31 to execute the above-explained process. Moreover, the external memory unit 33 supplies data stored by that program to the control unit 31 in accordance with an instruction given by the control unit 31, and stores data supplied from the control unit 31. The external memory unit 33 configures the first data memory unit 11 and the second data memory unit 12 both shown in FIG. 1 or 7. While the control unit 31 is executing an element group extracting process, some of data thereof are stored in the main memory unit 32, and are used for the operation of the control unit 31.

The operating unit 34 comprises a keyboard, a pointing device such as a mouse, and an interface device connecting the keyboard and the pointing device to the internal bus 30. Data on an element group to be analyzed and information for specifying a query that will be a base point of the relationship therebetween are input through the operating unit 34, and are supplied to the control unit 31. The operating unit 34 corresponds to the inputting unit 3 shown in FIG. 1 or 7.

The display unit 35 comprises a CRT (Cathode Ray Tube) or an LCD (Liquid Crystal Display), etc., and displays an unpredictability score and a scatter diagram of a relationship between elements. The display unit 35 is an example of the outputting unit 4 shown in FIG. 1 or 7. Moreover, the relationship detector 100 may include a printer, etc., as the outputting unit 4.

Furthermore, the relationship detector 100 may include a transmitting/receiving unit (not shown) connected to a network, and may search and collect data on an element group over the network. In this case, the relationship detector 100 as a hardware resource shown in FIG. 11 corresponds to the processing device 2 shown in FIG. 1 or 2.

Respective processes by the first distance calculating unit 21, the second distance calculating unit 22, the unpredictability calculating unit 23, the second unpredictability calculating unit 24, and the display processing unit 25 are executed upon running of the relationship detection program 500 with the control unit 31, the main memory unit 32, the external memory unit 33, the operating unit 34, and the display unit 35 being as resources.

The preferable modified examples of the present invention include following configurations.

Regarding the relationship detector according to a first aspect of the present invention, it is preferable that such a relationship detector includes a display unit that displays a relationship between two elements belonging to the above-explained group in an order of the level of dissociation calculated by the unpredictability calculating unit.

Preferably, the unpredictability calculating unit calculates, as the dissociation level, the value of a ratio between the second distance and the first distance.

Alternatively, or in addition, the unpredictability calculating unit calculates, as the dissociation level, a distance from a regression curve of the distribution of relationships each between two elements when the relationship of the two elements is plotted on a scatter diagram with the first distance and the second distance.

The relationship detector of the present invention can take a group of any one of or a combination of a document, a word, an event name, an organization name, a product name, a technology name, and a gene name or a group of plural combinations thereof as the group of elements having a first relationship and a second relationship different from the first relationship defined between elements.

The first distance or the second distance may be a distance relating to the co-occurrence level between two elements, a distance on a graph structure representing a relationship between elements, a distance in a vector space when the attribute of an element is expressed as a vector, or an edit distance when an element is expressed as a letter string, or a combination thereof.

Regarding the relationship detection method according to a second aspect of the present invention, preferably, such a method includes a display step of displaying a relationship between two elements belonging to the above-explained group in an order of the dissociation level calculated in the unpredictability calculating step.

Preferably, the unpredictability calculating step calculates, as the dissociation level, the value of a ratio between the second distance and the first distance.

Alternatively, or in addition, the unpredictability calculating step calculates, as the dissociation level, a distance from a regression curve of the distribution of relationships each between two elements when the relationship of the two elements is plotted on a scatter diagram with the first distance and the second distance.

The relationship detection method of the present invention can take a group of any one of or a combination of a document, a word, an event name, an organization name, a product name, a technology name, and a gene name or a group of plural combinations thereof as the group of elements having a first relationship and a second relationship different from the first relationship defined between elements.

The first distance or the second distance may be a distance relating to the co-occurrence level between two elements, a distance on a graph structure representing a relationship between elements, a distance in a vector space when the attribute of an element is expressed as a vector, or an edit distance when an element is expressed as a letter string, or a combination thereof.

Furthermore, the above-explained hardware configuration and flowcharts are merely examples, and can arbitrarily be changed and modified in various forms.

The major part of the relationship detector 100 which is configured by the control unit 31, the main memory unit 32, the external memory unit 33, the operating unit 34, and the internal bus 30, etc., and which executes the process can be realized by not an exclusive system but a general computer system. For example, the relationship detection program 500 for realizing the above-explained operations is stored in a computer-readable recording medium (e.g., a flexible disk, a CD-ROM, a DVD-ROM), and distributed, and installed in a computer, thereby making such a computer configured as the relationship detector 100 executing the above-explained processes. Moreover, the computer program may be stored in a memory device of a server device over a communication network like the Internet, and downloaded by a general computer system, thereby making such a computer system configured as the relationship detector 100.

When the function of the relationship detector 100 is dividingly beard by an OS (an operating system) and an application program or is realized by collaborative operations by the OS and the application program, only the application program part may be stored in a recording medium or a memory device.

Furthermore, it is possible to distribute such a computer program superimposed on a carried wave through a communication network. For example, the relationship detection program 500 may be pasted on a bulletin board (BBS: Bulletin Board System) over the communication network, and may be distributed through the network. The relationship detection program 500 is activated and run like the other application programs under the control of the OS, thereby causing the above-explained processes to be executed.

This application is based on Japanese Patent Application No. 2008-225585 filed on Sep. 3, 2008. The whole specification, claims, and drawings of this application are herein incorporated by reference.

INDUSTRIAL APPLICABILITY

According to the present invention, it becomes possible to search an unpredictable causal relationship of events with different topics although those events are located close to each other on a graph structure.

| | Description of Reference Numeral |
|---|---|
| 1 | Memory device |
| 2 | Processing device |
| 3 | Inputting unit |
| 4 | Outputting unit |
| 11 | First data memory unit |
| 12 | Second data memory unit |
| 21 | First distance calculating unit |
| 22 | Second distance calculating unit |
| 23 | Unpredictability calculating unit |
| 24 | Second unpredictability calculating unit |
| 25 | Display processing unit |

The invention claimed is:

1. A relationship detector for a group of elements defined with a first relationship between elements and a second relationship therebetween different from the first relationship, the relationship detector comprising:
   a first distance calculator that calculates a predetermined first distance between two elements belonging to the group in the first relationship;
   a second distance calculator that calculates a predetermined second distance between the two elements belonging to the group in the second relationship; and
   an unpredictability calculator that calculates a dissociation level between the first distance and the second distance each between the two elements belonging to the group through a predetermined rule,
   wherein the unpredictability calculator calculates a value of a ratio between the second distance and the first distance as the dissociation level.

2. The relationship detector according to claim 1, further comprising a display that displays a relationship between the two elements belonging to the group in an order of the dissociation level calculated by the unpredictability calculator.

3. The relationship detector according to claim 1, wherein the group of elements defined with the first relationship between elements and the second relationship therebetween different from the first relationship comprises a group of any one of or a plurality of combinations of the followings: a document, a word, an event name, an organization name, a product name, a technology name, and a gene name.

4. The relationship detector according to claim 1, wherein the first distance or the second distance comprises a distance relating to a co-occurrence level between two elements, a distance on a graph structure representing a relationship between elements, a distance in a vector space when an attribute of an element is expressed as a vector, or an edit distance when an element is expressed as a letter string, or a combination thereof.

5. A relationship detector for a group of elements defined with a first relationship between elements and a second relationship therebetween different from the first relationship, the relationship detector comprising:
   a first distance calculator that calculates a predetermined first distance between two elements belonging to the group in the first relationship;
   a second distance calculator that calculates a predetermined second distance between the two elements belonging to the group in the second relationship; and
   an unpredictability calculator that calculates a dissociation level between the first distance and the second distance each between the two elements belonging to the group through a predetermined rule,
   wherein the unpredictability calculating unit calculates, as the dissociation level, a distance from a regression curve of a distribution of relationships of the two elements when the relationship of the two elements is plotted on a scatter diagram with the first distance and the second distance.

6. A non-transitory computer-readable recording medium storing a relationship detection program, the relationship detection program allowing a computer to function as the relationship detector according to claim 5.

7. A relationship detection method for a group of elements defined with a first relationship between elements and a second relationship therebetween different from the first relationship, the relationship detection method comprising:

a first distance calculating of calculating a predetermined first distance between two elements belonging to the group in the first relationship;

a second distance calculating of calculating a predetermined second distance between the two elements belonging to the group in the second relationship; and an unpredictability calculating of calculating a dissociation level between the first distance and the second distance each between the two elements belonging to the group through a predetermined rule, wherein in the unpredictability calculating, a value of a ratio between the second distance and the first distance is calculated as the dissociation level.

8. The relationship detection method according to claim 7, further comprising displaying a relationship between the two elements belonging to the group in an order of the dissociation level calculated by the unpredictability calculating.

9. The relationship detection method according to claim 7, wherein the group of elements defined with the first relationship between elements and the second relationship therebetween different from the first relationship comprises a group of any one of or a plurality of combinations of the followings: a document, a word, an event name, an organization name, a product name, a technology name, and a gene name.

10. The relationship detection method according to claim 7, wherein the first distance or the second distance comprises a distance relating to a co-occurrence level between two elements, a distance on a graph structure representing a relationship between elements, a distance in a vector space when an attribute of an element is expressed as a vector, or an edit distance when an element is expressed as a letter string, or a combination thereof.

11. A relationship detection method for a group of elements defined with a first relationship between elements and a second relationship therebetween different from the first relationship, the relationship detection method comprising:

a first distance calculating of calculating a predetermined first distance between two elements belonging to the group in the first relationship;

a second distance calculating of calculating a predetermined second distance between the two elements belonging to the group in the second relationship; and an unpredictability calculating of calculating a dissociation level between the first distance and the second distance each between the two elements belonging to the group through a predetermined rule, wherein in the unpredictability calculating, as the dissociation level, a distance from a regression curve of a distribution of relationships of the two elements when the relationship of the two elements is plotted on a scatter diagram with the first distance and the second distance is calculated.

12. A non-transitory computer-readable recording medium storing a relationship detection program, the relationship detection program allowing a computer to perform the relationship detection method according to claim 11.

13. A non-transitory computer-readable recording medium storing a relationship detection program for a group of elements defined with a first relationship between elements and a second relationship therebetween different from the first relationship, the relationship detection program allowing a computer to function as:

a first distance calculating unit that calculates a predetermined first distance between two elements belonging to the group in the first relationship;

a second distance calculating unit that calculates a predetermined second distance between the two elements belonging to the group in the second relationship; and an unpredictability calculating unit that calculates a dissociation level between the first distance and the second distance each between the two elements belonging to the group through a predetermined rule, wherein the unpredictability calculator calculates a value of a ratio between the second distance and the first distance as the dissociation level.

\* \* \* \* \*